March 20, 1934.   P. E. EDELMAN   1,951,476
ALTERNATING CURRENT CONDENSERS AND ARRANGEMENT OF THE SAME
Filed April 2, 1929   2 Sheets-Sheet 1
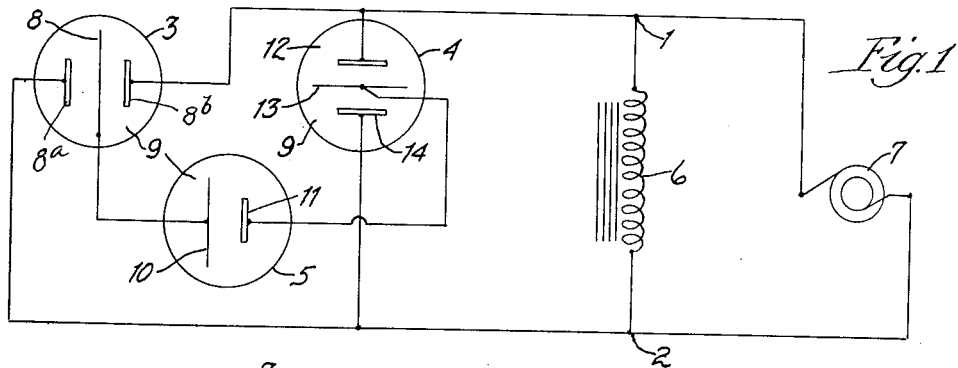
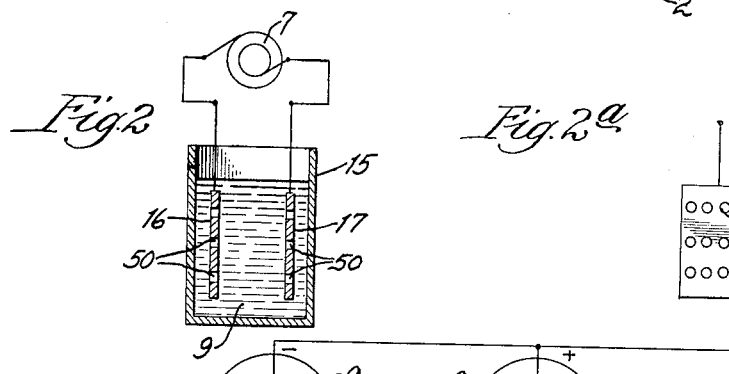
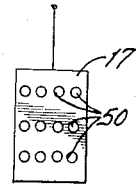
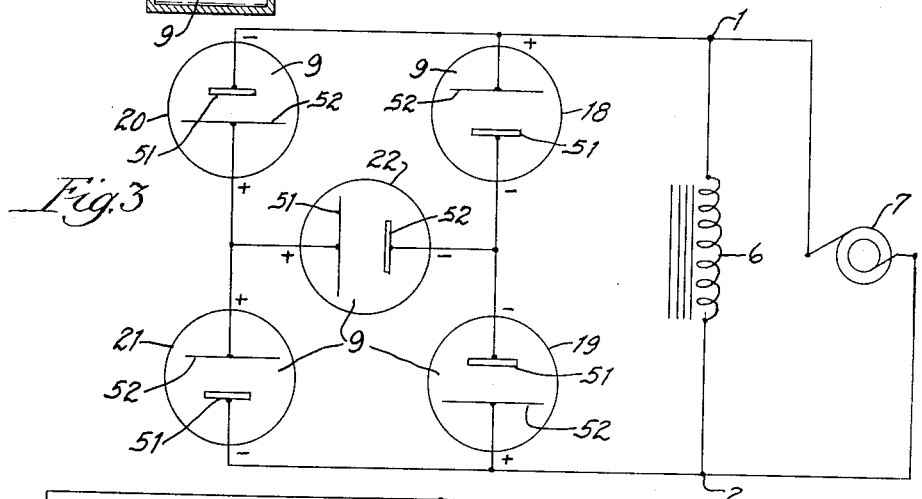
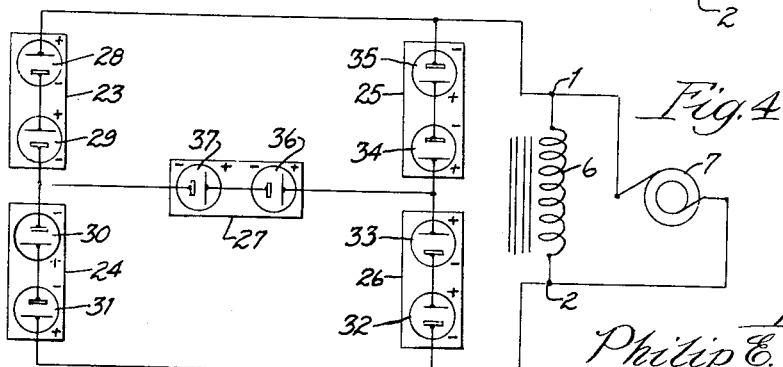
Inventor:
Philip E. Edelman,
By Banning & Banning
Attys.

March 20, 1934.  P. E. EDELMAN  1,951,476
ALTERNATING CURRENT CONDENSERS AND ARRANGEMENT OF THE SAME
Filed April 2, 1929  2 Sheets-Sheet 2

Inventor:
Philip E. Edelman,
By Bauning & Bauning
Attys.

Patented Mar. 20, 1934

1,951,476

UNITED STATES PATENT OFFICE 1,951,476

ALTERNATING CURRENT CONDENSERS AND ARRANGEMENT OF THE SAME

Philip E. Edelman, Chicago, Ill., assignor, by mesne assignments, to Robert T. Mack, trustee, Chicago, Ill.

Application April 2, 1929, Serial No. 352,010

6 Claims. (Cl. 175—315)

My present invention relates to electrolytic type condensers suitable for continuous operation on alternating current circuits, as for power factor correction, motor starting and running service, and other similar purposed requiring condensers.

An object of this invention is to provide an inexpensive reliable capacity continuously operable on alternating current supply. A further object is to improve the operating efficiency and durability of such condensers.

These and other objects are accomplished by this invention which is fully described in the following specification and shown in the accompanying drawings, in which—

Figure 1 is a diagram of an embodiment of the invention;

Fig. 2 is a diagram of a condenser section;

Figure 5:
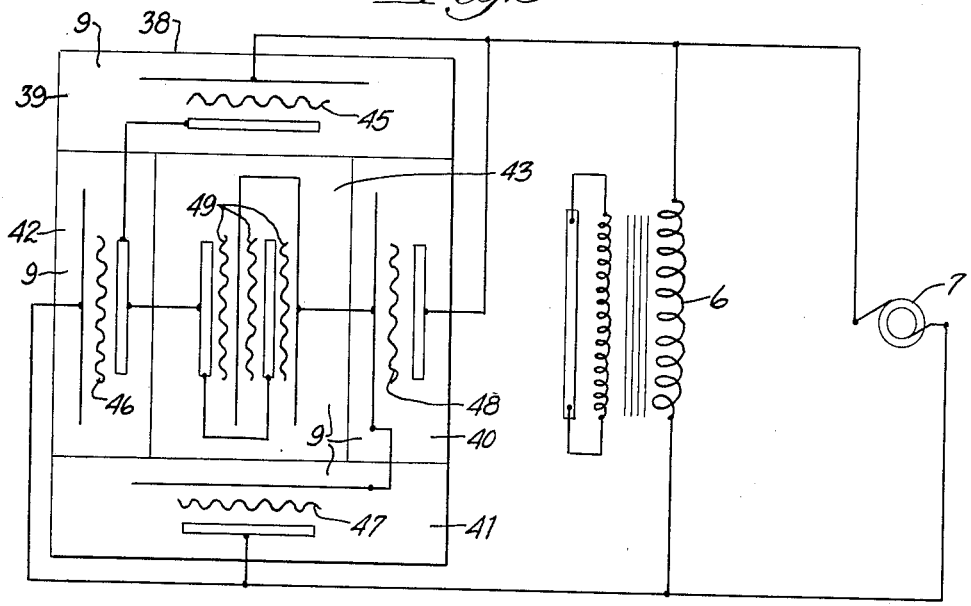
Figure 6:
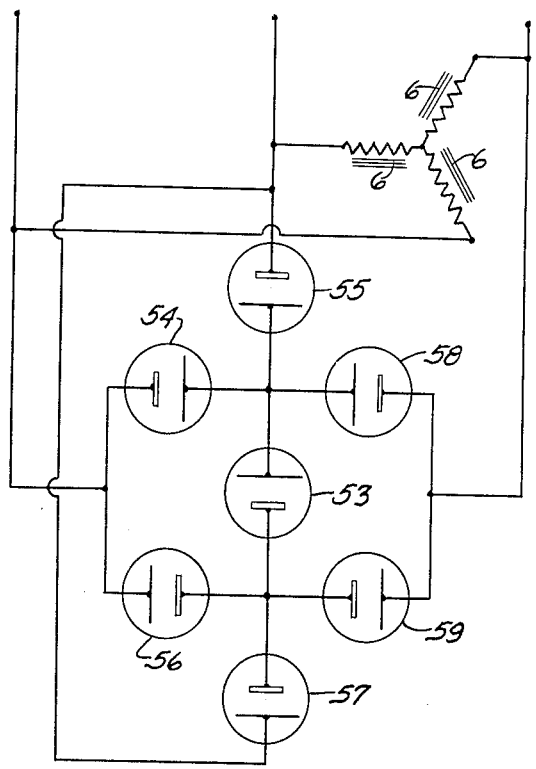

Fig. 2ª is a front elevation of a condenser electrode;

Fig. 3 is a diagram of a modification of Fig. 1;

Fig. 4 is a diagram of another modification of Fig. 1 suitable for operation on higher voltages;

Fig. 5 is a diagram of a modification of Fig. 1 suitable for power factor correction of a neon sign apparatus; and Fig. 6 is a diagram of a modification of Fig. 1 for a three phase system.

Heretofore a bar to the use of electrolytic type condensers on continuous alternating current service as distinguished from mere starting or temporary service of relatively short time duration has been the heating of the condenser with the ultimate destruction of its operating efficiency. Such service has accordingly been commercially limited to condensers of wax or oil impregnated paper and metal foil type, the expense of which has prohibited more general use for power factor and phase shifting services. The present invention provides a satisfactory alternating condenser for continuous service, as well as for use in starting and running condenser-induction type motors, for general power factor correction service, and other purposes requiring alternating current operation of condensers. The new and useful features thereof are more particularly pointed out in the appended claims, and I am describing the invention by way of exemplification only as various other uses therefor are well known in the art.

Owing to the much lower cost of making condensers of this character according to my invention, the useful application may hereafter be extended to numerous installations which were formerly not economically possible. My condensers may be directly connected across the alternating current supply mains, or in lieu of this may be connected across the secondary of either a step-down or step-up transformer operated thereon. While for illustration I show operation on single phase supply mains, operation may be had in a manner well understood in this art on commercial polyphase systems, of which an example is illustrated in Fig. 6, each phase or leg of such system being handled as for a single phase system as far as power factor correction is concerned. Similarly for condenser-induction motor service, the condensers will be operated across the auto-transformer winding thereof, as illustrated in the drawings in the example of a single phase use of the invention.

Referring now to Fig. 1, an alternating current supply system 7 with inductive load 6 has power factor correcting capacity terminals 1, 2 connected thereto. Terminals 1, 2 connect to an electrolytic type condenser array according to this invention. Two separate condenser groups 3 and 4 are shunted across terminals 1, 2, while a co-operating condenser group or tie-in section 5 is connected between group sections 3 and 4. Group section 3 has three electrodes 8, $8^a$ and $8^b$, contacting with an electrolyte mixture 9. Electrode 8 may consist of any suitable film forming metal, such as aluminum, beryllium, or tantalum. Electrode 8 may have a dielectric film preformed thereon as is customary in this art or the operating film may be formed thereon in service during operation thereof. Electrodes $8^a$ and $8^b$ are preferably of similar dimensions and may be composed of film forming material or some of them may be of non-film forming material. One of each pair must be film-forming. If of film forming material, electrodes $8^a$ and $8^b$ will be selected of metal the same as used for electrode 8, except that the operating area of each thereof contacting with electrolyte mixture 9 will be selected substantially the same for electrodes $8^a$ and $8^b$ but dissimilar in area from electrode 8 in such respect.

Thus, if all three electrodes 8, $8^a$, $8^b$, are prepared with films from film forming metal, such as aluminum, or tantalum, or beryllium, I prefer to have electrodes $8^a$ and $8^b$ of larger size relatively with respect to the area of electrode 8 contacting with electrolyte mixture 9. If, however, the metal used for electrodes $8^a$ and $8^b$ is duriron or other non-film forming metal, I prefer to have the three electrodes 8, $8^a$ and $8^b$ of like dimensions, though electrodes $8^a$ and $8^b$ may be made alike and either smaller or larger than electrode 8, if desired.

Electrolyte mixture 9 may be any suitable electrolyte or semi-solid or jellied or solidified electrolyte mass known in this art. I prefer, however, to employ a new and improved electrolyte mass 9 for this purpose which retains its operating efficiency within the temperature range of 0 to 140 degrees centigrade, and has no deteriorating action on electrodes 8, $8^a$, $8^b$. This electrolyte mass consists preferably of a mixture of gum arabic and potassium or ammonium bitartrate dissolved in hot glycerine. A suitable proportion, for example, is a mixture of from two to three pounds of powdered first-grade gum arabic and one-fourth to one ounce of potassium or ammonium bitartrate, C. P. grade powdered, dissolved in ten pounds of hot glycerine. This mixture boils at about 150 degrees centigrade, and at normal room temperature will have a sticky, gummy consistency of tannish orange or brown appearance. Optionally, if a solidified electrolyte mass is desired, a sufficient portion of gelatin may also be dissolved in the hot glycerine so that the mass solidifies upon cooling, or the amount of gum arabic used may be increased to form a supersaturated solution which solidifies into a gummy mass upon cooling. Or, if desired, the electrolyte mass 9 may be absorbed in spacer fabric sheets as is customary in this art.

The electrolyte mass 9 used in each condenser group section, as 3, 4, 5 is preferably selected of identical composition as hereinbefore set forth. The condenser group section 4, however, differs from that of group section 3 in that electrodes 12 and 14 are made identically like electrode 8 of section group 3, while electrode 13 of group section 4 is made the same as either electrode $8^a$ or $8^b$.

Similarly, a like electrolyte mass 9 is used for condenser section 5 while electrode 10 thereof may be made like electrode 8 of section group 3, and electrode 11 may then be made exactly like electrode $8^a$ or $8^b$ of group section 3. The relative area of electrodes 10 and 9 with respect to electrodes 8, $8^a$, $8^b$ may, however, advantageously be selected of larger value. Thus, for example, electrode 10 may be twice the area of electrode 8 while electrode 11 is made twice the area of electrode $8^a$ or $8^b$. Instead of twice the area last mentioned, any other larger area factor may be used, such as 1½, 2½, 3, or more.

Surprising advantages and added utility result in that each condenser group section 3, 4, is partly working in the function of a condenser during both half cycles of the alternating current supplied at terminals 1, 2, while condenser section 5 operates in the function of a condenser during both half cycles aforesaid and assists in maintaining correct polarization on all of the electrodes aforesaid of all group sections 3, 4, 5 so that the necessary dielectric films required on the electrodes respectively concerned are at all times maintained during operating service. In contra-distinction to this it may be remarked that if, as in prior art, either a single polarized condenser section or else either an aiding or a reversed series section of plural condenser cells were connected at terminals 1, 2, the same efficiency could not be obtained as in the case of the present invention. Considering first, a single condenser cell substituted at terminals 1, 2, same can function as a condenser during one-half cycle only while during the other half cycle it functions as a rectifier and resistance. Just as a rectifier requires that condenser action be minimized, so does useful condenser action require that rectifier action be minimized. The current passed during rectifier action in the permeable direction in such a cell merely causes rapid rise of temperature and heat loss accompanied by ultimate destruction of the efficiency of the cell in a relatively short time.

In such case, the electrolyte mass or electrolyte 9, Fig. 2, would be rapidly heated by alternate current flow from electrode 16 to electrode 17, and from electrode 17 to electrode 16. Thus, even when electrodes 16 and 17 are preformed with a film, such films become destroyed by the aforesaid action so that the cell 15 cannot serve the desired function for more than a relatively brief time. By making the effective areas of electrodes 16 and 17 of substantially identical size by perforating same to permit circulation of electrolyte 9, and by using relatively large masses of film forming metal for electrodes 16, 17 suitably preformed and separated by a small electrode distance in electrolyte 9 selected with composition affording rapid polarization, operation can be had on a low voltage from an alternating current supply source 7, but only at a fraction of the efficiency obtainable by the arrangement of Fig. 1.

The same may be said for either aiding or series reversed connections of series operated cells with the added difficulty that each cell must then be matched to the other or current distribution will be unequal and cause overload on one of the series cells. Considering two series cells with either cathodes or anodes junction connected, only one thereof functions as a condenser at any particular half cycle of the alternating current, while the other acts as a rectifier or resistance. Assuming equal size for the series condensers, the efficiency cannot be more than 50% and the effective capacity will be but half of the total available, while heat losses are increased. Besides this fault, each condenser of the series, aiding, or reversed, must stand the entire operating potential (peak voltage) so that the gain obtainable on a polarized or direct current operating source is thereby entirely lost on alternating current operation. It is readily understandable, therefore, why electrolytic condensers have heretofore been limited to service on direct current source, rectified current source or relatively brief time service on alternating current. Other than for brief starting service, such condensers have not found commercial use on alternating current circuits heretofore. Nor has the use of auxiliary polarizing apparatus aimed to preserve the operating film on the condenser electrodes been found useful for the intended purpose, even with the added cost thereof disregarded.

I have found perforations 50 in the metal electrodes, as 16, 17, Fig. 2, to be beneficial in permitting thermal action of the electrolyte mass 9 to cooperate with the filming metal of electrodes 16 and 17. Such perforations are preferably smooth rounded holes not greater than a diameter of twice the thickness of the metal sheets used for electrodes 16 and 17.

Referring now to Fig. 3, five condenser sections 20, 21, 18, 19, and 22 are used with three thereof functioning as condensers at any half cycle of the alternating current applied at terminals 1, 2. Thus, for one-half cycle, condenser sections 19, 20 and 22 operate in their condenser function, while sections 18 and 21 operate in partially permeable sense equivalent to combined resistance of small value with some rectifier action. On the next succeeding half cycle, however, condenser sections 18, 21 and 22 function as condensers, while sections 20 and 19 do not. Section 22 is advantageously made larger than the other sections 20, 21, 18, 19, and may for example be of twice the capacity or more, the only limitations being that of the resistance in the permeable sense of the other condenser sections as aforesaid. The total operating efficiency of the five sections 18, 19, 20, 21, 22 is accordingly greatly increased over that possible if only sections 18 and 19 or duplicate multiples thereof were used alone. The same is true if only sections 20, 21 or additional parallel multiples thereof were used alone.

The most effective use of the operating array of the condenser sections of Fig. 3 is readily calculable by proportioning section 22 with the largest capacity such that the leading current it passes through the resistance in the permeable sense of the other co-operating condenser sections 20, 21, 18, 19 as aforesaid through the electrolyte mixture 9 thereof does not set up a greater $(I)^2R$ loss therein than such sections 20, 21, 18, 19 can dissipate by the thermal mass action of such sections without increasing the temperature of the electrolyte mass 9 beyond the aforesaid operating range. A large factor of safety is thereby afforded, not only for normal operation, but for overloads. Moreover, there is added protection against permanent break downs due to surges at terminals 1, 2 because of the self-healing dielectric characteristic of the condenser sections, 20, 21, 18, 19 and 22. The greatest operating voltage for a single cell in each section 20, 21, 18, 19, 22, is that which each cell in such case can individually withstand. But there is a gain in total available capacity because electrolytic condensers in series connection either reversed or aiding have an effective capacity of only the value expressed (for two sections in series each with respective capacities $C_1$ and $C_2$) by the relation $$\frac{C_1 \times C_2}{C_1 + C_2},$$

The arrangement of Fig. 2 necessitates that the effective capacity of section 22 is at all times in increasing the available operating capacity as it is in effect in shunt relation to one of the series connected sections, as aforesaid. This arrangement is moreover effective in preserving the operating film on the electrodes of the sections 18, 19, 20, 21, 22 without requiring the aid of external or auxiliary polarizing apparatus, and the co-operating sections are able to function continuously without deterioration in utility.

Referring to Fig. 4, each condenser section, as 23, 24, 25, 26, 27 is itself made up of any desired number of individual series connected condensers connected in correct aiding sense for each section, as for example, condensers 28 and 29 for section 23. Any desired higher voltage for operation at terminals 1, 2 can thereby be safely accommodated by use of two or any higher number of plural aiding condensers per each section 23, 24, 25, 26, 27. Each section of aiding series connected condensers, as for example, condensers 36 and 37 of section 27, thereby functions as explained for Fig. 3 except that a correspondingly increased operating voltage can now be handled at terminals 1, 2.

By employing tantalum as the film forming metal and a relatively low resistance electrolyte mass 9, the arrangement of Fig. 4 is operative on very high peak voltages at terminals 1, 2 because any necessary number of aiding series condensers per section 23, 24, 25, 26, 27 respectively can thereby be had without increasing the electrolyte resistance in the permeable sense as set forth beyond the operating limits afforded according to the aforesaid operation. A suitable mass for electrolyte 9 for use with tantalum film forming metal electrodes on high voltage operation is afforded by dissolving gelatin in heated glycerine to which sulphuric acid is slowly added during cooling until a solid jelly mass results at room temperature, in the manner well known in the art of preparing jellied storage battery electrolyte, and understood by persons skilled in this art.

A compact unit alternating current condenser of small cost and continuous operation characteristic can be prepared for use in connection with neon sign outfits, and the like, according to Fig. 5. The neon sign or other inductive load 6 is operated in the usual manner from the source 7, and terminals 1, 2 are shunted thereacross.

A container 38 is divided into separate condenser section compartments 39, 40, 41, 42, 43, each condenser section being operated according to the arrangement of Fig. 3. Section 43 is arranged with the largest compartment in container 38, while the other sections 39, 40, 41, 42 are arranged thereabout so as to have the greatest relative thermal dissipating power since these latter are the sections most subject to internal heating. The electrolyte mass 9 in each compartment 39, 40, 41, 42, 43 is appropriately absorbed in a fibrous or fabric spacer element 45, 48, 47, 46, 49 respectively, which also serves to keep the individual electrode sheets of each section 39, 40, 41, 42, 43 respectively closely but permanently spaced at a proper minimum electrode distance minimizing electrolyte resistance of the mass 9 therebetween. Not only is the cost of such arrangement relatively small, but the bulk and weight is much less than in the case of the equivalent waxed paper and foil condenser required for the same effect. Such units may be insulatively mounted in a metal housing and sealed permanently for use.

Such condenser units may be operated at all times and in all climates when the aforesaid gum mixture is used for mass 9, because it is effective in the wide range of temperature, zero to 140 degrees centigrade. Even in sub-zero climate the unit will function because there is sufficient heat loss due to increased internal resistance at such lower temperature to operate the unit above the weather temperature then prevalent outdoors in such case. On the contrary, for warm climates the upper limit of operating range is normally never closely approached, as in such case the unit container 38 normally operates at but a few degrees higher than the outdoor weather temperature in which it is located, and can normally at all times be comfortably touched by a person's hand. The only precaution required in this respect is the use of sealing compound for container 38, which does not soften or melt in warm climates.

By well known circuit connections, the unit 38 may be employed as a voltage regulator for small load apparatus, such as radio receiving power packs which it can thereby protect from occasional rising voltage of supply mains. Or if desired, it may be used in service connection with induction-condenser type motors, across contactors of switchgear, or relays, or other electrical services in manner well understood in the art, using terminals 1, 2 in each case exactly the same as for an equivalent waxed paper and foil condenser of larger bulk and cost.

In service where a liquid electrolyte is not objectionable, I may employ a solution for electrolyte 9 selected with necessary characteristic for the purpose, and for example, a suitable composition therefor is 1 ounce of either potassium or ammonium bitartrate and ½ ounce of gum arabic dissolved in three pounds of hot distilled water. Such a solution remains clear in use and has no deteriorating effect on the filming electrodes used therewith.

In the case of the use of tantalum for film forming electrodes, I prefer to include a small portion of molybdic acid in the operating mass of electrolyte 9 to prevent disintegration of the tantalum metal during service operation thereof, as little as 1 part thereof in a thousand parts by weight of mass 9 used serving the purpose. When a liquid electrolyte containing water is employed as set forth, a relatively larger thermic mass must be provided in the condenser construction to dissipate heat arising therein as such electrolytes have a narrower temperature operating range, and are not serviceable on the higher temperatures that the aforesaid gum electrolyte mass can be operated.

Condenser units of this type employing aqueous solutions are accordingly necessarily of much larger bulk and limited operating characteristics.

The electrode areas in any case will depend on the desired capacity required, computed as is customary in this art, and proportioned according to the kilovoltampere capacity required in the condenser unit for the desired power factor correction according to usual practice.

It may be remarked that the preferred structure, as in Fig. 3 for example, is had with both electrodes of any section, as for example, 51 and 52 of section 19, constructed of screened or gridded or perforated film forming metal, preformed alike in all respects except for dissimilar working area or surface as aforesaid. Also it may be remarked that any condenser section, as for example, section 23 of Fig. 4 may itself comprise as many as ten or more series cells of the character set forth in the case of high working voltage service.

According to the exemplification of Fig. 6, the circuit per phase will be observed to be the same as in the arrangement of Fig. 3, condenser section 53 serving as the common tie-in condenser for the other four sections of each phase, as for example, for sections 54, 55, 56, 57, or for sections 55, 58, 59, 57, or for sections 54, 58, 56, 59, respectively according to the phase served by such array of sections. Each section as 54, for example, may itself comprise a series of aiding sections as set forth with reference to Fig. 4.

It may be remarked that whereas various other bridge circuit arrangements have been used in the electrical arts for different functions and purposes, a distinct advance is secured in this particular art set forth by the novel arrangement herein disclosed with the surprising advantages and added utility sought for thereby accomplished. This invention relates to the new and useful co-operative combination whereby the desired result is attained.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. A condenser array for alternating current service consisting of a plurality of reversed series polarized condensers connected across an alternating current supply source, a second group of oppositely reversed series polarized condensers also connected thereacross, a polarized electrolytic condenser connected between a junction of condensers in said first reversed series, and a junction of condensers in said second group of oppositely reversed series condensers.

2. An alternating current condenser array consisting of a first group of reversed series polarized electrolytic condensers connected to a source of alternating current, a second similar group of oppositely reversed series connected electrolytic condensers also connected to said source of alternating current, and a separate electrolytic condenser having its terminals each connected to an intermediate point in each of said groups of condensers to operatively connect said first and second groups together to maintain the polarization thereof.

3. An electrolytic condenser array for alternating current power factor correction, comprising a plurality of reversed series polarized condenser cells connected across an inductive load operated on an alternating current supply, a second group of oppositely reversed series polarized condenser cells also shunted thereacross, and a polarized electrolytic cell connected in opposing relation between a junction of cells in said first reversed series and a junction of cells in said second group of cells.

4. An alternating current power factor correcting condenser array comprising two groups of electrolytic condenser cells shunted across an inductive load on an alternating current supply circuit, the first of said groups having series connected condensers in opposing polarity relationship, the second group having similar condensers in a reversed polarity sequence, and a co-operating polarized electrolytic cell connected between said two groups in an opposing relation thereto to maintain the polarization of said groups.

5. An alternating current power factor correcting condenser array connected to a three phase inductive load on a polyphase alternating current system, comprising a combination of seven polarized electrolytic condenser cell sections divided into oppositely polarized groups connected together by one of said cell sections to maintain the polarity of said groups.

6. A polyphase alternating current power factor correcting condenser array connected to an inductive load on an alternating current power system, comprising a plurality of electrolytic polarized condenser cell sections placed in groups of divergent polarity, each having a reversed series of polarized cells, and a common polarizing electrolytic cell section interconnected in opposing relationship to said groups to maintain the polarities thereof.

PHILIP E. EDELMAN.